Feb. 16, 1965
D. S. PEARL
3,169,547
FLUID PRESSURE REGULATOR WITH FIXEDLY
AND POSITIVELY HELD SPRING
Filed Sept. 21, 1960
2 Sheets-Sheet 1
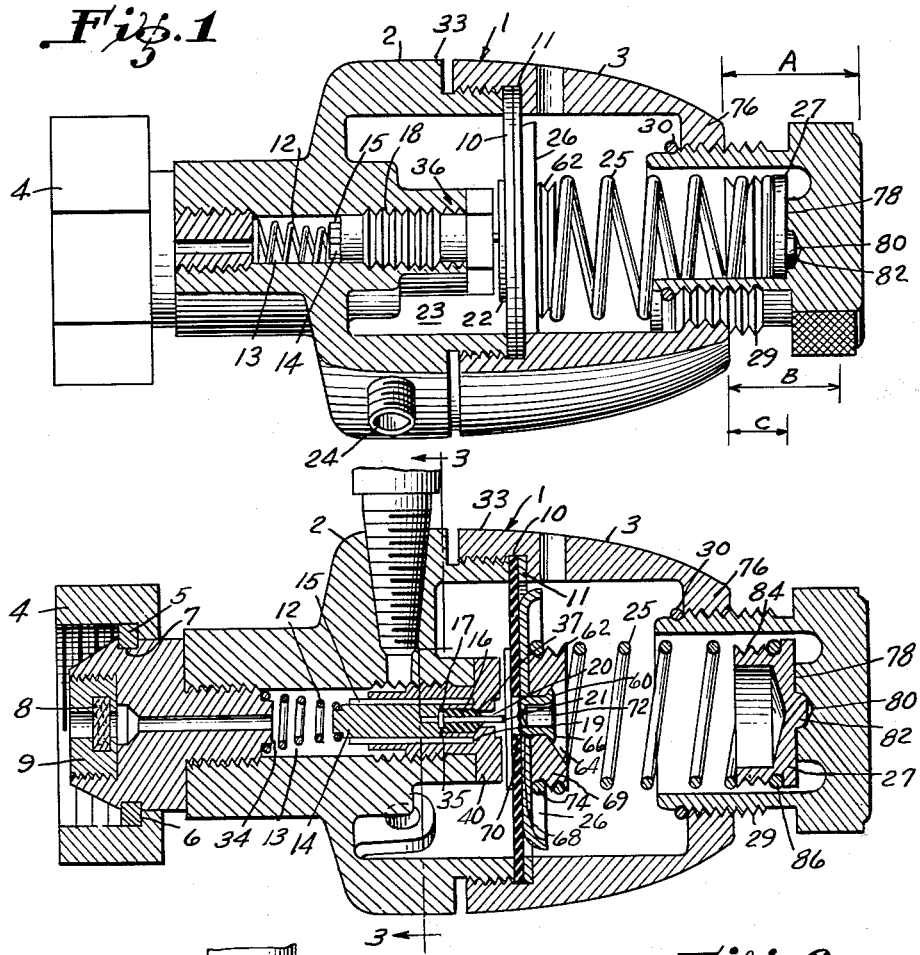
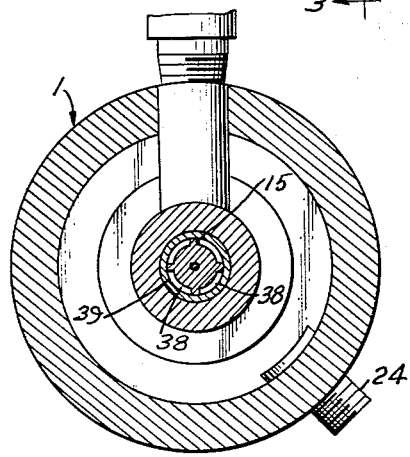
INVENTOR
David S. Pearl
BY
ATTORNEY INVENTOR
David S. Pearl

United States Patent Office 3,169,547
Patented Feb. 16, 1965

3,169,547
FLUID PRESSURE REGULATOR WITH FIXEDLY AND POSITIVELY HELD SPRING
David S. Pearl, 1344 NE. 13th Ave.,
Fort Lauderdale, Fla.
Filed Sept. 21, 1960, Ser. No. 57,423
4 Claims. (Cl. 137—505.42)

This invention relates to a fluid pressure regulator for regulating the output pressure of a variable pressure source, and copending with this application is my application Serial No. 49,517, filed on August 15, 1960, and entitled Fuid Pressure Regulator.

Fluid in a gaseous phase, such as acetylene gas or oxygen gas, taken from a variable pressure source, such as a tank containing said gaseous fluid under pressure, in many cases must be delivered to externally positioned apparatus which requires the fluid gas under constant pressure, such as for example, a cutting or welding or brazing torch. Fluid pressure regulators are designed to be so used.

The fluid pressure regulator of this invention converts an inlet fluid gas, such as, for example, oxygen gas or acetylene gas, taken from an external variable pressure source such as a tank confining the gas under pressure therein to a predetermined constant pressure at the outlet. An adjusting screw is threadedly mounted in the regulator casing, and the position of this adjusting screw determines the compression of a loading or pressure adjusting spring which applies a force to a diaphragm. This force is predetermined in accordance with the distance through which the adjusting screw passes into the casing and depends solely upon the position assumed by the adjusting screw after passing through said distance. In the operation of the regulator, a substantially constant predetermined outlet gas pressure is obtained by the interaction of opposing forces produced by the pressure adjusting spring against the combined forces of the gas under pressure within the outlet chamber and the force of the valve closing spring acting to position the diaphragm, which, in turn, positions the valve plug through the valve stem. The force exerted by the gas in the outlet chamber is the only variable force exerted upon the diaphragm during operation of the regulator, and, therefore, diaphragm movement depends only upon gas pressure change in the outlet chamber. Each of a plurality of predetermined fluid gas delivery pressures can be maintained substantially constant merely by holding, or maintaining, the adjusting screw at a predetermined position in the casing, said predetermined position determining the compression of the loading or pressure adjusting spring which, in turn, applies a predetermined force at that position to the diaphragm. Changes in force of the gas under pressure in the outlet chamber imparts movement to the diaphragm which, in turn, varies the opening at the valve to regulate the pressure in the outlet chamber. If the force of the gas under pressure in the outlet chamber be less than the force exerted by the adjusting spring on the diaphragm, the diaphragm causes the valve stem to move to open the valve and allow gas under pressure to pass from the inlet passage to the outlet chamber. Thusly is the gas pressure in the outlet chamber maintained at a substantially constant value. As is readily evident, each predetermined fluid gas delivery pressure depends upon a predetermined position of the adjusting screw and the accompanying predetermined compression of the pressure adjusting, or loading, spring, making it extremely important that the setting for each predetermined position of the adjusting screw and the accompanying predetermined compression of the loading spring, and thusly, the fluid gas delivery pressure, viz. the outlet gas pressure, be reproducible to within 0.005 pound per square inch after the gas has been turned off and then turned on. To maintain a gas delivery pressure, once set in accordance with the position of the adjusting screw and, of course, with the compression of the pressure adjusting, or loading spring, it is of extreme importance to maintain the position of the pressure adjusting spring constant with respect to the component parts with which it is operatively associated.

As is well known, prior hereto the pressure adjusting spring, or diaphragm spring, or loading spring, in a fluid pressure regulator has been attached between and to its respective end plates by means of rubber adhesive, synthetic rubber adhesive, or any suitable plasticized cement. Also, said prior art adjusting springs have been guided and sustained in position by means of inner and/or outer guides. In some cases, both the adhesive and the guides have been utilized. However, in the prior art fluid pressure regulators, the pressure adjusting spring invariably is so positioned that, after a relatively short time of use, it shifts angularly or begins to move transversely with respect to its longitudinal axis in the fixed position and also with respect to its end plates thereby making it impossible to maintain a predetermined position of the adjusting screw together with the accompanying predetermined compression of the pressure adjusting spring for a predetermined fluid gas delivery pressure.

Prior art fluid pressure regulators have been such that they have operated with an objectionable hum. The flow of high pressure inlet fluid along the valve closing spring and the turbulence of the gas expanding to a lower pressure at the valve plug and seat tend to establish sonic vibrations in the plug carrier and also in the valve closing spring. In addition, the movement of the diaphragm at a position offset from its center, caused by the transverse shifting of the pressure adjusting spring after a relatively short time of use, is responsible to some extent for said hum. Prior art regulators have attempted to eliminate this hum by the use of a cylindrically shaped valve closing spring having a large length to diameter ratio, viz. about 4.25 to 1, which tends to buckle when lightly compressed so that some of the valve closing spring convolutions will contact the walls of the inlet passage and thereby suppress the tendency of the movable valve element to hum. This method of reducing hum causes the valve closing spring to be subjected to a great amount of wear due to the constant frictional force exerted upon the convolutions contacting the inlet passage walls.

In the aforementioned copending application I provided a patentably novel structure of a fluid pressure regulator including a frustoconically shaped valve closing spring of predetermined dimensional characteristics with respect to the portion of the valve carrier element positioned within the adapter when the valve is in the closed position, said frustoconically shaped valve closing spring having a maximum outside diameter which is less than the diameter of the inlet passage by a predetermined amount, and a carrier slideably mounted in an adapter to form a slip-in fit, the diameter of the carrier through the flutes and the diameter of the adapter differing in size by a predetermined amount when said valve is in the closed position. In said fluid pressure regulator hum is eliminated at the valve closing spring and at the valve seat and throughout the regulator generally during operation with simultaneous elimination of frictional wear at the valve closing spring and the carrier flutes.

I here provide a fluid pressure regulator including means positioned at one end portion of the pressure adjusting spring for holding said pressure adjusting spring against rotation and against shifting with respect to the diaphragm and the diaphragm pressure plate and for simultaneously holding said pressure plate in fixed abutment against said diaphragm and also means positioned at and in contact with the other end portion of the pressure adjusting spring for holding said spring against shifting with respect to the adjusting screw and also with respect to said diaphragm pressure plate and said diaphragm. Said latter means also includes the spring bearing plate which is operatively associated with the adjusting screw. Said first mentioned means also includes a wearing plate against which the valve stem abuts. By reason of said structural features, there is obtained a great spring constancy with the result that, when pressure is relieved from the pressure adjusting spring, the pressure adjusting spring will not shift transversely or angularly to its longitudinal axis and a once set gas delivery pressure can be reproduced by the same movement as heretofore of the adjusting screw into the casing. Also, the pressure adjusting spring is fixedly positioned with respect to the diaphragm pressure plate and the bearing plate and the adjusting screw for the normal life of the regulator.

An object of this invention is to provide a fluid pressure regulator in which there are maintained reproducible once set fluid delivery pressures.

Another object of this invention is to provide a fluid pressure regulator in which the pressure regulating spring does not shift transversely or angularly with respect to its longitudinal axis which is fixed during the normal life of said regulator.

Other objects and features will become apparent from the following detailed description of the preferred embodiments of my invention.

FIGURE 1 is an elevational perspective view partially in section of my fluid pressure regulator, the valve therein being in closed position.

FIGURE 2 is a longitudinal cross-sectional view of one embodiment of the fluid pressure regulator of this invention.

FIGURE 3 is a cross-sectional view of the fluid pressure regulator of this invention taken along line 3—3 in FIGURE 2.

Figure 4:
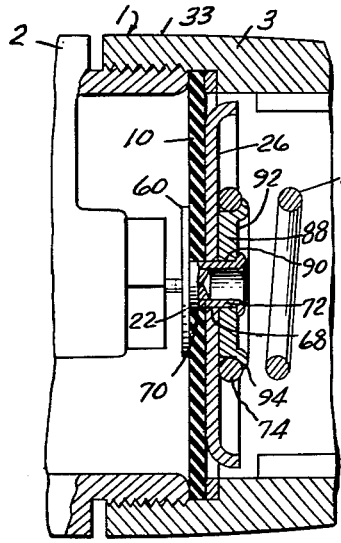
FIGURE 4 is a partial longitudinal cross-sectional view of a second embodiment of the fluid pressure regulator of this invention.

More specifically, there is provided regulator assembly 1 having body 2 fitted within threaded bonnet 3 forming a casing 33. The regulator assembly 1 is connected to a source of variable high pressure fluid (not shown), such as a tank, by a metallic compression nut 4. Body 2, bonnet 3, compression nut 4 and snap ring 5 are preferably made from a metal which is not easily oxidized, such as brass. The collar of compression nut 4 works against metallic snap ring 5. Said snap ring 5 is seated in a groove 6 machined into the integral inlet neck 7 of regulator body 2. A filter 8 is mounted within filter holder 9 at the high pressure inlet, and the filter holder 9 is threadedly mounted into inlet neck 7.

Regulator body 2 and bonnet 3 secure diaphragm 10 which is fixedly positioned within the casing and extends across said casing forming two separate compartments. Diaphragm 10 can be made, for example, from an impregnated fabric. Washer 11 is secured within said casing by body 2 and bonnet 3, as clearly shown in the appended drawings.

Inlet passage 12 is in body 2, and frustoconically shaped valve closing spring 13 is positioned therewithin at its upstream end. The bottom or largest diameter portion of said frustoconically shaped valve closing spring 13 abuts inlet neck 7 and is positioned about and held in place by cylindrical projection 34 thereof. The top or smallest diameter portions of said frustoconically shaped valve closing spring 13 is attached to the movable carrier element portion of valve 36 which is downstream of said valve closing spring 13 and within inlet passage 12, said valve 36 including a carrier element 14 having integral therewith circumferentially spaced and axially positioned longitudinal flutes 15, valve plug 16 and vents 17 located at the rear of recess 35 in carrier 14 for holding the material of valve plug 16, so that any pressure developed while forcing the plug material into its recess is relieved through said vents 17. The valve also contains a stationary valve seat member 37. Flutes 15 form passageways 38 through which the incoming gas is supplied. Carrier 14 is slideably mounted within adapter 18 to form a slip-in fit, the greatest diameter of carrier 14 taken across flutes 15 being from about 0.002 inch to about 0.005 inch less than the diameter of adapter 18. This slip-in fit will substantially eliminate any carrier movement caused by turbulence at the valve plug and seat.

The ratio of the outside diameter of the bottom of valve closing spring 13 to the outside diameter of the top of said valve closing spring is about 1.4 to about 1. The ratio of the length of valve closing spring 13 when valve 36 is in the closed position to the outside diameter of the top of said valve closing spring is about 2 to about 1. The ratio of the length of the portion of carrier 14 within adapter 18 when the valve is in closed position to the outside diameter of the top of valve closing spring 13 is about 3.5 to about 1. The diameter of inlet passage 12 is greater than the diameter of the bottom of valve closing spring 13, and said valve closing spring 13 is never in contact with the walls of inlet passage 12 at any time. The ratio of the diameter of said inlet passage 12 to the outside diameter of the bottom of said valve closing spring is about 1.3 to about 1.

Bore 39, preferably cylindrically shaped, of adapter 18 terminates with end wall 19 having machined valve seat 37 and outlet opening in the central portion thereof. The adapter body terminates with hexagonally shaped head 40, as clearly shown in the appended drawings. Valve stem 21 extends through outlet opening 20 and rests against wearing plate 22 on the gas side of the diaphragm 10, said wearing plate being the head of the fastener 60 in the means for holding the pressure adjusting spring 25 against rotation and against shifting with respect to pressure plate 26 against diaphragm 10 and for simultaneously holding the pressure plate 26 in fixed abutment against the diaphragm 10. Head 40 of adapter 18 limits the maximum travel of diaphragm 10 in the direction tending to open valve 36. Outlet opening 20 leads into outlet chamber 23 where the fluid is collected at reduced constant pressure and is then passed to outlet 24.

Referring to the embodiment in FIGURE 2, bonnet 3 has positioned therein helical pressure adjusting spring 25. Abutting diaphragm 10 is pressure plate 26, and abutting pressure plate 26 is washer 69 having an outer threaded surface 62. Washer 69 includes a countersunk bore 64 coextensive and coaxial with opening 66 therethrough axially aligned with opening 68 through pressure plate 26 and opening 70 through diaphragm 10, each of said openings being preferably in the center of the respective member. Fastener 60 is preferably a flat head rivet having a hollow shank 72 and head 22. The hollow shank 72 of fastener 60 extends through opening 70, opening 68 and opening 66 and is flared against the surface of countersunk bore 64, thereby holding head 22 in contact with and against diaphragm 10, as shown in the appended drawing. Likewise, washer 69 is held against pressure plate 26, and pressure plate 26 is held against diaphragm 10, as shown in the appended drawing. Of particular note is the fact that the outside diameter of shank 72 is from 0.002″ to 0.005″ smaller than each of the diameters of openings 70, 68, and 66, thereby making for a slip-in fit and substantially no transverse movement of said shank 72 when positioned through said openings. The end portion of spring 25, and particularly convolution 74, is threadedly engaged with threaded surface 62 and is lockingly and permanently fastened thereto. Thusly, is the pressure adjusting spring 25 held against shifting angularly with respect to its longitudinal axis and with respect to pressure plate 26 and against rotation while the pressure plate 26 is simultaneously held in fixed abutment against diaphragm 10. Also, the end portion 76 of bonnet 3 is internally threaded to receive threaded adjusting screw 29, as shown in the appended drawing. Snap ring 30, preferably of steel, prevents adjusting screw 29 from being threadedly removed from bonnet 3. Extending from adjusting screw 29 is annularly extending flange 78 defining recess 80, preferably conically shaped, the end surface of said flange contacting the surface of bearing plate 27, said bearing plate surface having projection 82, preferably centrally positioned and preferably hemispherically shaped, received in recess 80 and in contact with the recess surface, as shown in the appended drawing. Extending from bearing plate 27 is annularly extending flange 84, preferably centrally positioned and axially aligned with washer 69, having its outer surface threaded. The other end portion of pressure adjusting spring 25, and particularly convolution 86, is threadedly engaged with said threaded surface of flange 84 and is lockingly and permanently fastened thereto.

Referring to the embodiment in FIGURE 4, this embodiment differs from that shown in FIGURE 2 and hereinbefore described only in the means for holding the pressure adjusting spring 25 against rotation and against shifting with respect to pressure plate 26 in abutting position against diaphragm 10 and for simultaneously holding pressure plate 26 in fixed abutment against diaphragm 10. Abutting diaphragm 10 is pressure plate 26, and abutting pressure plate 26 is washer 88. Washer 88 has therethrough opening 90 axially aligned with opening 68 through pressure plate 26 and opening 70 through diaphragm 10, each of said openings being preferably in the center of the respective member. Fastener 60 is preferably a flat head rivet having a hollow shank 72 and head 22. The hollow shank 72 of fastener 60 extends through opening 70, opening 68, and opening 90 and is flared against surface 92 of washer 88, thereby holding head or wearing plate 22 in contact with and against diaphragm 10, as shown in the appended drawing. Likewise, washer 88 is held against pressure plate 26, and pressure plate 26 is held against diaphragm 10, as shown in the appended drawing. Of particular note is the fact that the outside diameter of shank 72 is from 0.002" to 0.005" smaller than each of the diameters of openings 70, 68, and 90, thereby making for a slip-in fit and substantially no transverse movement of said shank when positioned through said openings. Extending from said surface 92 is axially disposed flange 94 flared over end portion of spring 25, and particularly convolution 74. Thusly is pressure adjusting spring 25 held against shifting angularly with respect to its longitudinal axis and with respect to pressure plate 26 and against rotation while pressure plate 26 is simultaneously held in fixed abutment against diaphragm 10. Also, the end portion 76 of bonnet 3 is internally threaded to receive adjusting screw 29. Snap ring 30, preferably of steel, prevents adjusting screw 29 from being threadedly removed from bonnet 3. Extending from adjusting screw 29 is annularly extending flange 78 defining recess 80, preferably conically shaped, the end surface of said flange contacting the surface of bearing plate 27, said bearing plate surface having projection 82, preferably centrally positioned and preferably hemispherically shaped, received in recess 80 and in contact with the recess surface, as shown in appended FIGURE 2. Extending from bearing plate 27 is annularly extending flange 84, preferably centrally positioned and axially aligned with washer 88, having its outer surface threaded. The other end portion of pressure adjusting spring 25, and particularly convolution 86, is threadedly engaged with said threaded surface of flange 84 and is lockingly and permanently fastened thereto.

Figure 5:
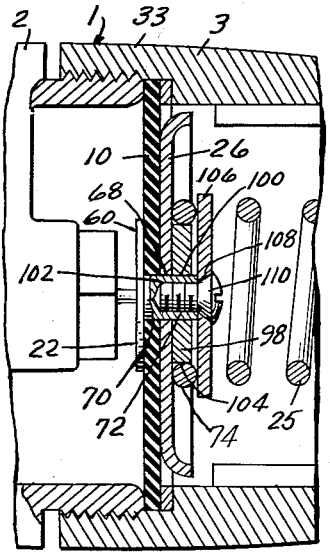
FIGURE 5 is a partial longitudinal cross-sectional view of a third embodiment of the fluid pressure regulator of this invention.

Referring to the embodiment shown in FIGURE 5, this embodiment differs from that shown in FIGURE 2 and hereinbefore described only in the means for holding the pressure adjusting spring 25 against rotation and against shifting with respect to pressure plate 26 in abutting position against diaphragm 10 and for simultaneously holding pressure plate 26 in fixed abutment against diaphragm 10. Abutting diaphragm 10 is pressure plate 26, and abutting pressure plate 26 is washer 98. Washer 98 has therethrough opening 100 axially aligned with opening 68 through pressure plate 26 and opening 70 through diaphragm 10, each of said openings being preferably in the center of the respective member. Fastener 60 is preferably a flat head rivet having hollow shank 72 and head 22. The hollow shank 72 of fastener 60 extends through opening 70, opening 68, and opening 100, and the bore 102 of shank 72 is internally threaded. Positioned about and in contact with the outer surface 104 of said washer 98 is the convolution 74 of pressure adjusting spring 25. Positioned over and in contact with top portion of convolution 74 is washer 106 which is axially aligned with washer 98 and has a countersunk opening 108 therethrough axially aligned with openings 100, 98, and 70. The screw 110 is passed through opening 108 and threadedly received by threaded bore 102 of shank 72, thereby holding wearing plate 22 in contact with and against diaphragm 10, as shown in the appended drawing. Likewise, washer 106 is held against convolution 74, washer 98 is held against pressure plate 26, and pressure plate 26 is held against diaphragm 10, as shown in the appended drawing. Of particular note is the fact that the outside diameter of shank 72 is from 0.002" to 0.005" smaller than each of the diameters of openings 70, 68, and 100 and that opening 108 is such that the head of screw 110 makes a tight fit therewith, thereby making for a slip-in fit with respect to said shank 72 and for a tight fit with respect to said screw head and substantially no transverse movement of said shank when positioned through said openings and no transverse movement of said screw when so received in said threaded bore of said shank. Thusly is the convolution 74 and also spring 25 held tightly against the outer surface 104 of washer 98, against pressure plate 26, and against the surface of washer 106, as shown in the appended drawings, and thusly is pressure adjusting spring 25 held against shifting angularly with respect to its longitudinal axis and with respect to pressure plate 26 and against rotation while pressure plate 26 is simultaneously held in fixed abutment against diaphragm 10. Also, the end portion 76 of bonnet 3 is internally threaded to receive adjusting screw 29. Snap ring 30, preferably of steel, prevents adjusting screw 29 from being threadedly removed from bonnet 3. Extending from adjusting screw 29 is annularly extending flange 78 defining recess 80, preferably conically shaped, the end surface of said flange contacting the surface of bearing plate 27, said bearing plate surface having projection 82, preferably centrally positioned and preferably hemispherically shaped, received in recess 80 and in contact with the recess surface, as shown in appended FIGURE 2. Extending from bearing plate 27 is annularly extending flange 84, preferably centrally positioned and axially aligned with washer 106, having its outer surface threaded. The other end portion of pressure adjusting spring 25, and particularly convolution 86, is threadedly engaged with said threaded surface of flange 84 and is lockingly and permanently fastened thereto.

Figure 6:
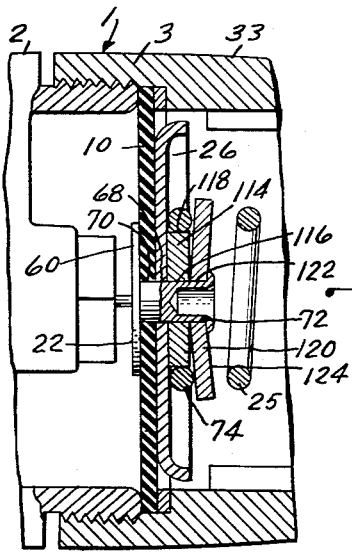
FIGURE 6 is a partial longitudinal cross-sectional view of a fourth embodiment of the fluid pressure regulator of this invention.

Referring to the embodiment shown in FIGURE 6, this embodiment differs from that shown in FIGURE 2 and hereinbefore described only in the means for holding the pressure adjusting spring 25 against rotation and against shifting with respect to pressure plate 26 in abutting position against diaphragm 10 and for simultaneously holding pressure plate 26 in fixed abutment against diaphragm 10. Abutting diaphragm 10 is pressure plate 26, and abutting pressure plate 26 is washer 114. Washer 114 has therethrough opening 116 axially aligned with opening 68 through pressure plate 26 and opening 70 through diaphragm 10, each of said openings being preferably in the center of the respective member. Positioned about and in contact with the outer surface 118 of washer 114 is convolution 74 of pressure adjusting spring 25. Positioned over and in contact with top portion of convolution 74 is washer 120 which is aixally aligned with washer 114 and has opening 122 therethrough axially aligned with openings 70, 68, and 116. Fastener 60 is preferably a flat head rivet having hollow shank 72 and head 22. Hollow shank 72 extends through openings 70, 68, 116, and 122, and is flared against surface 124 of washer 120, thereby holding head or wearing plate 22 in contact with and against convolution 74. Likewise, washer 120 is held against convolution 74, washer 114 is held against pressure plate 26, and pressure plate 26 is held against diaphragm 10, as shown in the appended drawing. Of particular note is the fact that the outside diameter of shank 72 is from 0.002″ to 0.005″ smaller than each of the diameters of openings 70, 68, 116, and 120, thereby making for a slip-in fit and substantially no transverse movement of said shank when positioned through said openings. Thusly is convolution 74, and also spring 25, held tightly against the outer surface 118 of washer 114, against pressure plate 26, and against the surface of washer 120, as shown in the appended drawing, and thusly is pressure adjusting spring 25 held against shifting angularly with respect to its longitudinal axis and with respect to pressure plate 26 and against rotation while pressure plate 26 is simultaneously held in fixed abutment against diaphragm 10. Also, the end portion 76 of bonnet 3 is internally threaded to receive adjusting screw 29. Snap ring 30, preferably of steel, prevents adjusting screw 29 from being threadedly removed from bonnet 3. Extending from adjusting screw 29 is annularly extending flange 78 defining recess 80, preferably conically shaped, the end surface of said flange contacting the surface of bearing plate 27, said bearing plate surface having projection 82, preferably centrally positioned and preferably hemispherically shaped, received in recess 80 and in contact with the recess surface, as shown in appended FIGURE 2. Extending from bearing plate 27 is annularly extending flange 84, preferably centrally positioned, and axially aligned with washer 120 and also washer 114, having its outer surface threaded. The other end portion of pressure adjusting spring 25, and particularly convolution 86, is threadedly engaged with said threaded surface of flange 84 and is lockingly and permanently fastened thereto.

The inner and outer diameters of pressure adjusting spring 25 are constant throughout the length of said spring, and the outside diameter of flange 84 is substantially equal to each of the outer diameters of washer 69, of washer 88, of washer 98, and of washer 114, respectively.

The fluid pressure regulators of this invention operate as follows: Pressure adjusting screw 29 is threadedly positioned at a predetermined position with respect to bonnet 3 for a predetermined fluid gas delivery pressure, and thereby determines the compression of pressure adjusting spring 25 for said predetermined fluid gas delivery pressure, said adjusting spring 25 applying a force to diaphragm 10. Referring to FIGURE 2, the distance between the top surface of pressure adjusting screw 29 and bonnet end is shown by a A for a predetermined fluid gas delivery pressure of $a$ pounds per square inch. High pressure gas enters the regulator passing through filter 8, into inlet passage 12, through and around valve closing spring 13, and through passageways 38 between flutes 15 within adapter 18. The inlet gas pressure is sensed by and indicated on a gauge (not shown), said gas pressure being sensed in passage 32 coextensive with inlet passage 12, as clearly shown in the appended drawing. The pressure of the gas flowing into outlet opening 20 is controlled by the variable annular opening between the rounded portion of seat 37 and the tapered end of valve plug 16 as in any plug type valve. A substantially constant predetermined outlet gas pressure is obtained by the interaction of opposing forces produced by the pressure adjusting spring 25 against the combined forces of the gas under pressure within outlet chamber 23 plus the force of the valve closing spring acting to position diaphragm 10, which, in turn, positions valve plug 16 through valve stem 21. For example, at a fixed predetermined position of adjusting screw 29, as shown by A, and, of course, a fixed predetermined pressure adjusting spring 25 compression force, the fluid gas delivery pressure of $a$ pounds per square inch will be fixed for that position of adjusting screw 29 and that compression of pressure adjusting spring 25. If the gas pressure be lower in chamber 23 than said predetermined gas delivery pressure of $a$ pounds per square inch, the force of said gas in outlet chamber 23 on diaphragm 10 is reduced and pressure adjusting spring 25 urges diaphragm 10 against stem 21 which backs valve plug 16 away from valve seat 37 thereby allowing a greater area for gas to flow under pressure into outlet opening 20 and thence into outlet chamber 23 to increase the gas in outlet chamber 23 and thereby to increase the gas pressure in outlet chamber 23 to the predetermined gas delivery pressure of $a$ pounds per square inch, as desired. Likewise, other desired predetermined gas delivery pressures of $b$ pounds per square inch and $c$ pounds per square inch may be obtained by changing the distance A to B and C, as shown in FIGURE 2.

With the patentably novel structure as hereinbefore described, the said gas delivery pressures can be each accurately reproduced, after the flow of gas has been shut off and the position of the adjusting screw 29 has been changed, and maintained as closely as 0.005 pound per square inch for the once set predetermined positions, including those as exemplified by A, B and C.

Many alterations and changes may be made without departing from the spirit and scope of this invention which is set forth in the appended claims which are to be construed as broadly as possible in view of the prior art.

I claim:
1. A fluid pressure regulator comprising, in combination, a casing, said casing having a fluid inlet passage and a fluid outlet passage, a valve between said fluid inlet passage and said fluid outlet passage, a flexible diaphragm positioned within said casing, said passages and said valve being on one side of said diaphragm, a pressure plate having at least a portion of one surface thereof abutting said diaphragm on the other side of said diaphragm at at least a portion of one surface of said diaphragm, a pressure adjusting spring positioned within said casing on said other side of said diaphragm, means positioned at one end portion of said pressure adjusting spring for fixedly and positively holding said pressure adjusting spring against rotation and against shifting with respect to said pressure plate in said abutting position against at least said portion of said one surface of said diaphragm and for simultaneously holding said pressure plate at at least said portion of said one surface thereof in fixed abutment against said diaphragm at at least said portion of said one surface thereof, said means including a first washer positioned at one surface thereof against said pressure plate at at least a portion of the other surface of said pressure plate, said first washer being in contact, at at least a portion of its outer surface, with at least a portion of at least one convolution of said pressure adjusting spring at said one end portion thereof, a first fastener member extending through said diaphragm and said pressure plate and said first washer, said first fastener including a head member and a shank member depending therefrom, said shank member having, for at least a portion of its length, a bore therein, said head member constituting a wearing plate and being positioned on said other side of said diaphragm and in fixed abutment against at least a portion of the other surface of said diaphragm, a second washer axially aligned with said first washer and positioned over and in contact with at least a portion of said one convolution of said pressure adjusting spring, and a second fastener means for holding said second washer positioned over and in contact with at least a portion of said one convolution and for holding said wearing plate fixed against said diaphragm surface, said second fastener extending through said second washer and being fixedly positioned for a portion thereof in at least a portion of said bore of said shank of said first fastener, said valve including a movable carrier element and stem means for moving said carrier element upon movement of said diaphragm, said stem means being attached to said carrier element and abutting said wearing plate, a valve closing spring attached to said carrier element, said spring being positioned in said fluid inlet passage, means for controlling the loading of said pressure adjusting spring to obtain predetermined fluid delivery pressures, said means being operatively associated with said casing, and means positioned at and in contact with the other end portion of said pressure adjusting spring for fixedly and positively holding said pressure adjusting spring against shifting with respect to said control means and with respect to said pressure plate, said latter means being operatively associated with said control means, whereby each of a plurality of fluid delivery pressures can be maintained and whereby the longitudinal axis of said pressure adjusting spring will not be shifted during constant usage of the regulator and whereby said pressure adjusting spring will not be rotated during constant usage of the regulator.

2. A fluid pressure regulator comprising, in combination, a casing, said casing having a fluid inlet passage and a fluid outlet passage; a valve between said fluid inlet passage and said fluid outlet passage, a flexible diaphragm positioned within said casing, said passages and said valve being on one side of said diaphragm, a pressure plate having at least a portion of one surface thereof abutting said diaphragm on the other side of said diaphragm at at least a portion of one surface of said diaphragm, a pressure adjusting spring positioned within said casing on said other side of said diaphragm, means positioned at one end portion of said pressure adjusting spring for fixedly and positively holding said pressure adjusting spring against rotation and against shifting with respect to said pressure plate in said abutting position against at least said portion of said one surface of said diaphragm and for simultaneously holding said pressure plate at at least said portion of said one surface thereof in fixed abutment against said diaphragm at at least said portion of said one surface thereof, said means including a first washer positioned at one surface thereof against said pressure plate at at least a portion of the other surface of said pressure plate, said first washer being in contact, at at least a portion of its outer surface, with at least a portion of at least one convolution of said pressure adjusting spring at said one end portion thereof, a first fastener member extending through said diaphragm and said pressure plate and said first washer, said first fastener including a head member and a shank member depending therefrom, said shank member having, for at least a portion of its length, a bore therein, said head member constituting a wearing plate and being positioned on said other side of said diaphragm and in fixed abutment against at least a portion of the other surface of said diaphragm, a second washer axially aligned with said first washer and positioned over and in contact with at least a portion of said one convolution of said pressure adjusting spring, and a second fastener means for holding said second washer positioned over and in contact with at least a portion of said one convolution and for holding said wearing plate fixed against said diaphragm surface, said second fastener extending through said second washer and being fixedly positioned for a portion thereof in at least a portion of said bore of said shank of said first fastener, said valve including a movable carrier element and stem means for moving said carrier element upon movement of said diaphragm, said stem means being attached to said carrier element and abutting said wearing plate, a valve closing spring attached to said carrier element, said spring being positioned in said fluid inlet passage, means for controlling the loading of said pressure adjusting spring to obtain predetermined fluid delivery pressures, said means being operatively associated with said casing, and means positioned at and in contact with the other end portion of said pressure adjusting spring for fixedly and positively holding said pressure adjusting spring against shifting with respect to said control means and with respect to said pressure plate, said latter means being operatively associated with said control means, said means including a bearing plate member, an axially disposed member extending from said bearing plate, said axially disposed member being threaded at its outer surface for at least a portion thereof, said other end portion of said pressure adjusting spring threadedly and lockingly engaging said axially disposed member at said threaded outer surface, whereby each of a plurality of fluid delivery pressures can be maintained and whereby the longitudinal axis of said pressure adjusting spring will not be shifted during constant usage of the regulator and whereby said pressure adjusting spring will not be rotated during constant usage of the regulator.

3. A fluid pressure regulator comprising, in combination, a casing, said casing having a fluid inlet passage and a fluid outlet passage, a valve between said fluid inlet passage and said fluid outlet passage, a flexible diaphragm positioned within said casing, said passages and said valve being on one side of said diaphragm, a pressure plate having at least a portion of one surface thereof abutting said diaphragm on the other side of said diaphragm at at least a portion of one surface of said diaphragm, a pressure adjusting spring positioned within said casing on said other side of said diaphragm, means positioned at one end portion of said pressure adjusting spring for fixedly and positively holding said pressure adjusting spring against rotation and against shifting with respect to said pressure plate in said abutting position against at least said portion of said one surface of said diaphragm and for simultaneously holding said pressure plate at at least said portion of said one surface thereof in fixed abutment against said diaphragm at at least said portion of said one surface thereof, said means including a first washer positioned at one surface thereof against said pressure plate at at least a portion of the other surface of said pressure plate, said first washer being in contact, at at least a portion of its outer surface, with at least a portion of at least one convolution of said pressure adjusting spring at said one end portion thereof, a second washer axially aligned with said first washer and positioned over and in contact, at at least a portion of one surface thereof, with at least a portion of said one convolution of said pressure adjusting spring, a fastener member extending through said diaphragm, said pressure plate, said first washer and said second washer, said fastener including a head member and a shank member depending therefrom, said shank member being hollow for at least a portion of its length, said head member constituting a wearing plate and being positioned on said other side of said diaphragm and in fixed abutment against at least a portion of the other surface of said diaphragm, said shank member being flared against said second washer at the surface thereof opposite to said one surface thereof, said valve including a movable carrier element and stem means for moving said carrier element upon movement of said diaphragm, said stem means being attached to said carrier element and abutting said wearing plate, a valve closing spring attached to said carrier element, said spring being positioned in said first fluid inlet passage, means for controlling the loading of said pressure adjusting spring to obtain predetermined fluid delivery pressures, said means being operatively associated with said casing, and means positioned at and in contact with the other end portion of said pressure adjusting spring for fixedly and positively holding said pressure adjusting spring against shifting with respect to said control means and with respect to said pressure plate, said latter means being operatively associated with said control means, whereby each of a plurality of fluid delivery pressures can be maintained and whereby the longitudinal axis of said pressure adjusting spring will not be shifted during constant usage of the regulator and whereby said pressure adjusting spring will not be rotated during constant usage of the regulator.

4. A fluid pressure regulator comprising, in combination, a casing, said casing having a fluid inlet passage and a fluid outlet passage, a valve between said fluid inlet passage and said fluid outlet passage, a flexible diaphragm positioned within said casing, said passages and said valve being on one side of said diaphragm, a pressure plate having at least a portion of one surface thereof abutting said diaphragm on the other side of said diaphragm at at least a portion of one surface of said diaphragm, a pressure adjusting spring positioned within said casing on said other side of said diaphragm, means positioned at one end portion of said pressure adjusting spring for fixedly and positively holding said pressure adjusting spring against rotation and against shifting with respect to said pressure plate in said abutting position against at least said portion of said one surface of said diaphragm and for simultaneously holding said pressure plate at at least said portion of said one surface thereof in fixed abutment against said diaphragm at at least said portion of said one surface thereof, said means including a first washer positioned at one surface thereof against said pressure plate at at least a portion of the other surface of said pressure plate, said first washer being in contact, at at least a portion of its outer surface, with at least a portion of at least one convolution of said pressure adjusting spring at said one end portion thereof, a second washer axially aligned with said first washer and positioned over and in contact, at at least a portion of one surface thereof, with at least a portion of said one convolution of said pressure adjusting spring, a fastener member extending through said diaphragm, said pressure plate, said first washer and said second washer, said fastener including a head member and a shank member depending therefrom, said shank member being hollow for at least a portion of its length, said head member constituting a wearing plate and being positioned on said other side of said diaphragm and in fixed abutment against at least a portion of the other surface of said diaphragm, said shank member being flared against said second washer at the surface thereof opposite to said one surface thereof, said valve tincluding a movable carrier element and stem means for moving said carrier element upon movement of said diaphragm, said stem means being attached to said carrier element and abutting said wearing plate, a valve closing spring attached to said carrier element, said spring being positioned in said fluid inlet passage, means for controlling the loading of said pressure adjusting spring to obtain predetermined fluid delivery pressures, said means being operatively associated with said casing, and means positioned at and in contact with the other end portion of said pressure adjusting spring for fixedly and positively holding said pressure adjusting spring against shifting with respect to said control means and with respect to said pressure plate, said latter means being operatively associated with said control means, said means including a bearing plate member, an axially disposed member extending from said bearing plate, said axially disposed member being threaded at its outer surface for at least a portion thereof, said other end portion of said pressure adjusting spring threadedly and lockingly engaging said axially disposed member at said threaded outer surface, whereby each of a plurality of fluid delivery pressures can be maintained and whereby the longitudinal axis of said pressure adjusting spring will not be shifted during constant usage of the regulator and whereby said pressure adjusting spring will not be rotated during constant usage of the regulator.

References Cited in the file of this patent
UNITED STATES PATENTS

| | | |
|---|---|---|
| 1,264,006 | Bucknam | Apr. 23, 1918 |
| 2,206,425 | Perman | July 2, 1940 |
| 2,247,037 | Smith | June 24, 1941 |
| 2,265,629 | Christiansen | Dec. 9, 1941 |
| 2,487,650 | Grove | Nov. 8, 1949 |
| 2,627,866 | Holmes | Feb. 10, 1953 |
| 2,662,348 | Jacobsson | Dec. 15, 1953 |
| 2,735,669 | Seiler | Feb. 21, 1956 |
| 2,858,845 | Ensing | Nov. 4, 1958 |
| 2,879,971 | Demay | Mar. 31, 1959 |
| 2,996,295 | Smith | Aug. 15, 1961 |